US007177778B2

(12) United States Patent
Gaur et al.

(10) Patent No.: US 7,177,778 B2
(45) Date of Patent: Feb. 13, 2007

(54) MANAGING DATA PROCESSING RATES AT A NETWORK ADAPTER USING A TEMPERATURE SENSOR

(75) Inventors: Daniel R. Gaur, Beaverton, OR (US); Patrick L. Connor, Portland, OR (US); Scott P. Dubal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/001,434

(22) Filed: Nov. 30, 2004

(65) Prior Publication Data

US 2006/0116844 A1 Jun. 1, 2006

(51) Int. Cl.
*G01K 13/00* (2006.01)
*G05D 23/00* (2006.01)

(52) U.S. Cl. .............. 702/130; 700/299; 374/100
(58) Field of Classification Search ............ 702/130
See application file for complete search history.

(56) References Cited

U.S. PATENT DOCUMENTS

| 6,363,490 | B1* | 3/2002 | Senyk ................. 713/300 |
| 6,470,238 | B1* | 10/2002 | Nizar et al. ............. 700/299 |
| 6,786,639 | B2* | 9/2004 | Covi et al. ............. 374/178 |
| 6,847,911 | B2* | 1/2005 | Huckaby et al. .......... 702/130 |
| 2002/0116143 | A1* | 8/2002 | Lalau et al. ............ 702/130 |
| 2002/0173858 | A1* | 11/2002 | Sherlock ................ 700/1 |
| 2003/0191854 | A1* | 10/2003 | Hsu et al. .............. 709/233 |
| 2004/0243629 | A1* | 12/2004 | Nomura et al. .......... 707/104.1 |

OTHER PUBLICATIONS

Webopedia Term dictionary- http://www.webopedia.com/TERM/D/DSLAM.html.*
Techweb encyclopedia—http://www.techweb.com/encyclopedia/defineterm.jhtml?term=ATU.*

* cited by examiner

*Primary Examiner*—John Barlow
*Assistant Examiner*—Jonathan Moffat
(74) *Attorney, Agent, or Firm*—David W. Victor; Konrad Raynes & Victor LLP

(57) ABSTRACT

Provided is a method and system for managing data processing rates at a network adapter using a temperature sensor. A temperature of a component in the adapter transmitting data over a network is measured. A rate at which data is processed in the adapter over the network is reduced in response to determining that the measured temperature exceeds a threshold.

24 Claims, 3 Drawing Sheets

MANAGING DATA PROCESSING RATES AT A NETWORK ADAPTER USING A TEMPERATURE SENSOR

BACKGROUND

A network adapter enables a computer to transmit and receive data over a network or direct connection to another device. As network speeds increase, network adapters are designed to operate at higher speeds to support these faster network links. These increased adapter speeds raise the operating temperature of the adapter hardware to the point where the device may require a heat sink to dissipate heat and lower the temperature. Ever faster network adapters require larger heat dissipation devices, such as heat sinks. These heat related problems are only exacerbated as the speed of networks and the need to develop ever faster network adapter cards continually increases.

BRIEF DESCRIPTION OF THE DRAWINGS

Referring now to the drawings in which like reference numbers represent corresponding parts throughout.

DETAILED DESCRIPTION

Figure 1:
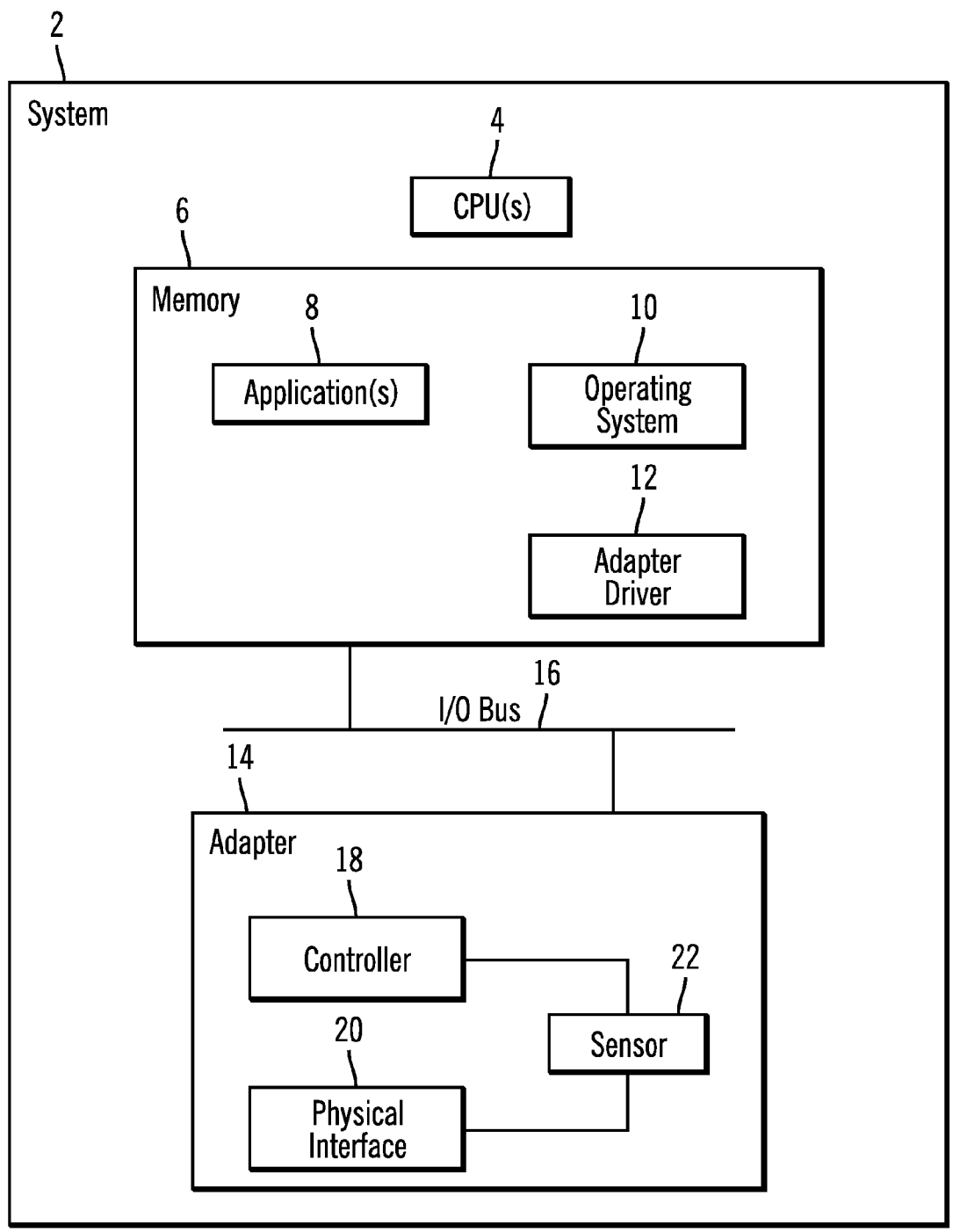
FIG. 1 illustrates a computing environment in which embodiments are implemented.

FIG. 1 illustrates a computing system 2 having at least one central processing unit (CPU) 4 and a memory 6, such as a volatile memory, in which programs execute. The CPU 4 executes in the memory 6 one or more application programs 8, an operating system 10, and an adapter driver 12 that processes packets to and from a network adapter 14 according to one or more network transmission protocols known in the art, such as the Transmission Control Protocol (TCP)/Internet Protocol (IP), the Internet Packet Exchange (IPX) protocol, etc. Details of the TCP/IP protocol are discussed in the publication "A TCP/IP Tutorial", Network Working Group Request for Comments No. 1180 (1991), the IPX protocol is described in the publication "Novell IPX Over Various WAN Media (IPXWAN)", Network Working Group Request for Comments No. 1362 (1992), etc. The adapter driver 12 forwards packets to the adapter over an Input/Output (I/O) bus 16.

The adapter 14 includes a controller 18 that performs packet processing and management operations and manages the transmission of packets to a physical interface 20 to transmit over a network (not shown) and the forwarding of packets to the adapter driver 12. The controller 18 may include a data link layer (not shown) which passes frames between the physical layer 20 in the adapter 14 and a network layer (not shown). In Ethernet IEEE 802.3 embodiments, the controller 18 includes a logical link control layer and Media Access Control (MAC) sublayer: The MAC sublayer may perform such operations as framing, addressing, error detection, and contention resolution as defined in the IEEE 802.03 specification referenced above. The physical interface 20 handles the physical signaling and includes an auto-negotiation function to perform auto-negotiation operations to detect a link speed of the link partner and perform the parallel detection operation to detect the link speed for link partner devices that do not include auto-negotiation, such as 10BASE-T, 100BASE-TX, and 100BASE-T4 compatible devices. The physical interface 20 may comprise a multi-speed optics module to connect to a fiber optic network or a module to connect to a cable consisting of one or more symmetrical metallic elements, e.g., copper, such as twisted pairs, quads, etc.

The adapter 14 may be implemented in a chipset mounted on the system 2 motherboard, such as a Local Area Network (LAN) on Motherboard (LOM) implementation, or may be implemented in an expansion card that is inserted in an expansion slot on the system 2 motherboard. The bus 16 may comprise bus interfaces known in the art, such as the Peripheral Component Interconnect (PCI) bus described in the publication "Conventional PCI 2.3", published by the PCI-SIG. An additional PCI protocol comprises the PCI Express protocol described in the publication "PCI Express Base Specification 1.0a", published by the PCI-SIG.

The adapter 14 further includes a thermal sensor 22 coupled to the controller 18 and physical interface 20 to measure the temperatures of these adapter 14 components. The sensor 22 may comprise multiple thermal sensor devices to independently measure the temperatures of the controller 18 and physical interface 20 or a single thermal sensor device to measure the temperature of both components 18 and 20. FIG. 1 shows the sensor 22 coupled to both the controller 18 and physical interface 20. In alternative embodiments, the temperature sensor 22 may be coupled to only one of the controller 18 or physical interface 20, not both.

Figure 2:
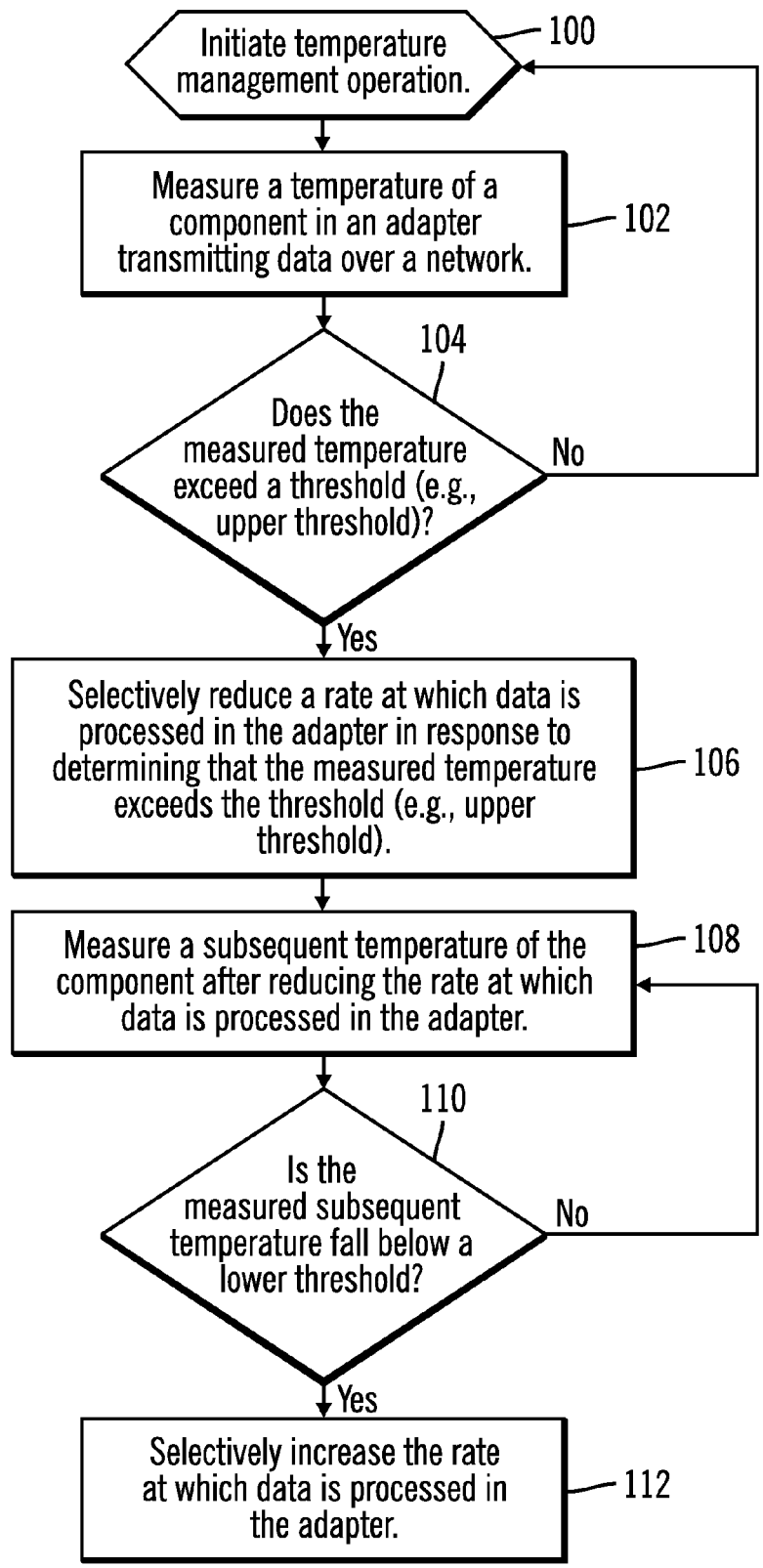
FIGS. 2 and 3 illustrate an embodiment of operations to select an adapter to use to transmit a packet.

FIG. 2 illustrates operations performed in the sensor 22 and adapter controller 18 or adapter driver 12 to manage adapter 14 operations in response to measured temperature of adapter 14 components. Upon initiating (at block 100) temperature management operations, the sensor 22 measures (at block 102) a temperature of a component, such as the controller 18 and/or physical interface 20 in the adapter 14 transmitting data over a network during adapter operations. If (at block 104) the measured temperature exceeds a threshold, e.g., an upper threshold, then the component managing the temperature related adjustments reduces (at block 106) a rate at which data is processed in the adapter 14 in response to determining that the measured temperature exceeds the threshold (e.g., upper threshold). In one embodiment, the adapter controller 18 or adapter driver 12 may perform the operations to reduce the rate at which data is processed to cause a reduction in the temperature of the adapter components, e.g., controller 18 and/or physical interface 20 being monitored. Reducing the rate at which the controller 18 and/or physical interface 20 process packets for transmission by the adapter 14 reduces heat because less energy is consumed and expended by these components as the rate of data processing decreases. If the adapter components 18 and 20 receive and process packets at a slower rate, then the amount of energy consumed by the adapter components 18 and 20 to process packets is reduced, thereby reducing the heat produced and temperature at the adapter components 18 and 20. This reduction in the rate of processing thus results in slowing the data transmission rate on the network. Further, by reducing the rate at which the adapter driver 12 processes packets, the driver 12 forwards packets to the adapter 14 at a slower rate, thereby slowing the rate at which the adapter 14 transmits packets on the network.

If (at block 104) the measured temperature does not exceed the upper threshold, then control returns to block 100 to continue monitoring and managing the adapter temperature.

In one embodiment, the sensor 22 may communicate a signal to the adapter controller 18 or adapter driver 12 indicating that the temperature of the measured component (s) exceeds an upper threshold or communicate the actual measured temperature. The controller 18 or driver 12 receiving the signal or temperature then determines whether the measured temperature exceeds the upper threshold. The upper threshold may be adapter component specific, such that it is sufficiently below a temperature of the component that could cause damage to the component and other components within the adapter 14 and system 2. The upper threshold may be set to a temperature that is sufficiently away from a critical temperature where there is sufficient tine for a reduction in the rate at which data is processed to cause a reduction in temperature of the component before a critical and dangerous temperature is reached. Different components, such as the controller 18 and physical interface 20, may have different upper thresholds depending on the specific heat profile characteristics of the component, such as the components ability to dissipate heat and the components structural tolerance to high temperatures.

The rate at which data is processed may be reduced by lowering a link speed at which the physical interface 20 of the adapter negotiates to transmit data over the network. In an alternative embodiment, reducing the rate at which data is processed may comprise reducing a rate at which packets of data are processed and sent to the physical interface 20 to transmit. The adapter controller 18 or driver 12 may reduce the rate at which packets are processed by slowing the rate at which packet queues are processed or by inserting delays between the processing of queued packets.

After reducing the rate at which data is processed, the sensor 22 may measure (at block 108) a subsequent temperature of the component, e.g., the controller 18 and/or physical interface 20. If (at block 10) the measured subsequent temperature falls below a lower threshold, i.e., is no longer in a temperature danger zone that could threaten the measured component, then the driver 12 or controller 18 managing the data processing rate may increase (at block 112) the rate at which data is transmitted and processed at the adapter. The rate at which data is processed may be increased to the rate prior to the reduction at block 106. If (at block 10) the measured subsequent temperature has not fallen to the lower threshold, then control returns to block 108 to continue monitoring for that lower threshold to be reached. In an alternative embodiment, if (at block 110) the measured subsequent temperature has not fallen to the lower threshold, then control may proceed to block 104 to determine if the temperature still remains at the upper threshold and, if so, further reductions in the rate at which data is processed may be implemented to avoid overheating and damage to the component.

Figure 3:
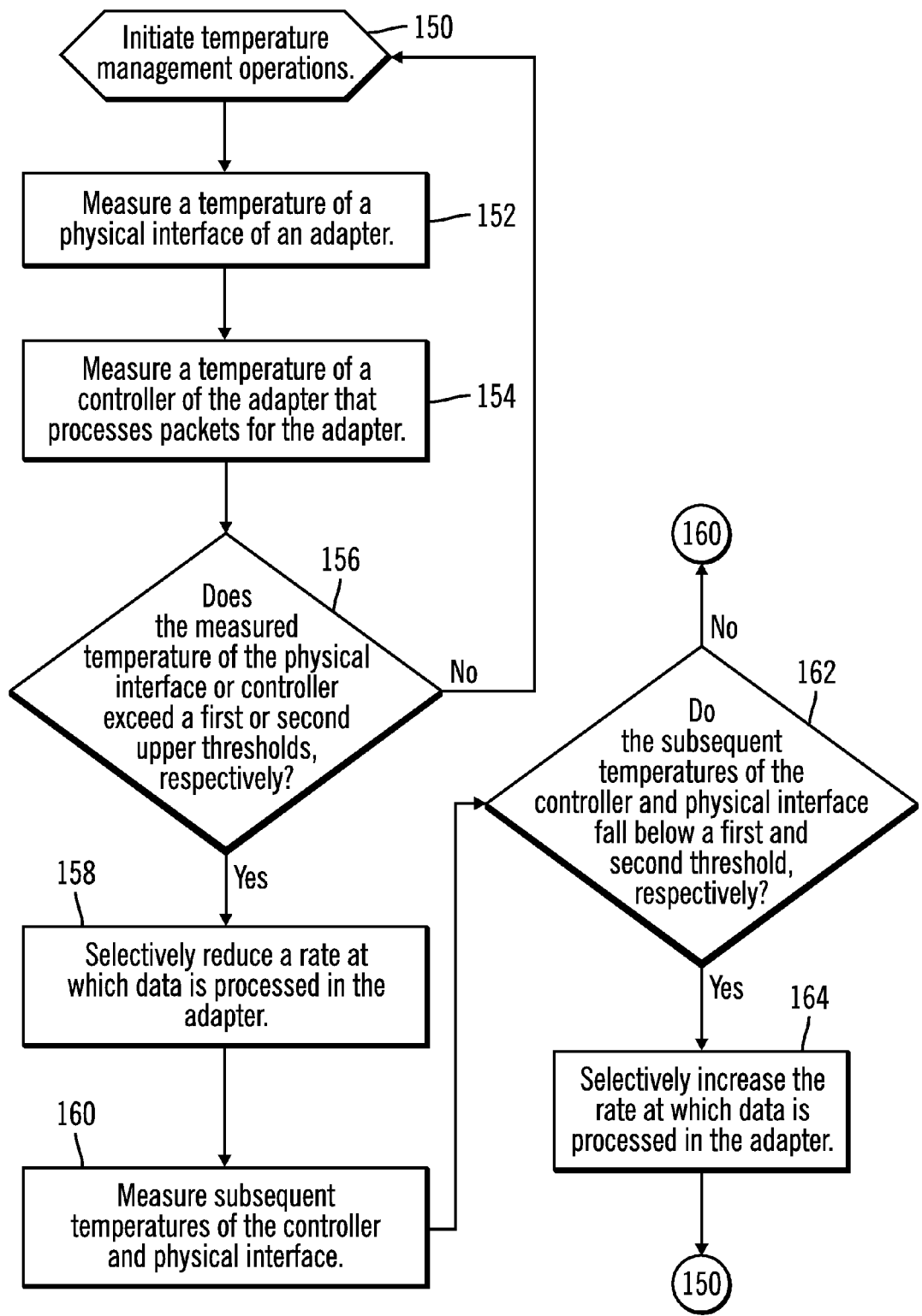

FIG. 3 illustrates an additional embodiment performed in the sensor 22 and adapter controller 18 or adapter driver 12 to manage adapter 14 operations in response to a measured temperature of the adapter controller 18 and physical interface 20. Upon initiating (at block 150) temperature management operations, the sensor 22 measures (at block 152) a temperature of the physical interface 20 of the adapter 14 and measures (at block 154) the temperature of the controller 18. If (at block 156) the measured temperature of the physical interface 20 or controller 18 exceeds a first or second upper thresholds, respectively, then the rate at which data is processed in the adapter is reduced (at block 158). The adapter driver 12 and/or controller 18 may cause the reduction in the rate at which data is processed in the adapter 14 as discussed above. In the embodiment above, the rate at which data is processed is reduced if the temperature of either the controller 18 or physical interface 20 exceeds their respective upper threshold. Alternatively, the rate may be reduced only if the temperature of both components 18 and 20 exceed their respective threshold. If (at block 156) the measured temperatures do not exceed the first or second upper thresholds, then control returns to block 150 to continue temperature monitoring operations.

After reducing the rate at which data is processed, the sensor 22 measures (at block 160) subsequent temperatures of the controller 18 and physical interface 20. If (at block 162) the subsequent temperatures of the controller 18 and physical interface 20 fall below a first and second lower thresholds, respectively, then the rate at which data is processed in the adapter 14 is increased (at block 164). After increasing the rate, control returns to block 150 to continue monitoring whether the temperatures increase back to a critical level. Otherwise, if the temperatures have not fallen below the first and second thresholds, then control returns to block 160 to continue to measure whether the temperatures have fallen sufficiently as a result of reducing the rate at which data is processed in the adapter 14. In an alternative embodiment, if (at block 162) the temperatures of either the controller 18 or physical interface 20 remain above their respective upper threshold, then further reductions in the rate at which data is processed may be implemented to avoid overheating and damage to the component.

Described embodiments provide techniques to monitor temperature of components of a network adapter to detect temperatures reaching dangerous and threatening levels. If the temperatures are in the danger zone, then described embodiments provide actions to take to reduce the rate at which the adapter components process and transmit packets to affect a reduction in the adapter component temperature from the danger zone levels.

ADDITIONAL EMBODIMENT DETAILS

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In described embodiments, the sensor 22 monitored the adapter controller 18 and physical interface 20. In alternative embodiments, the sensor 22 may monitor the temperature at other adapter components and affect the processing rate at the adapter 14 and the other monitored components to reduce the temperature of such other components.

The illustrated operations of FIGS. 2 and 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   measuring a temperature of a component in an adapter transmitting packets over a network, wherein the measured component comprises at least one of a controller that performs packet processing in the adaptor and a physical interface that transmits and receives packets on a network;
   selectively causing the physical interface to reduce a link speed at which the physical interface negotiates to transmit packets over the network in response to determining that the measured temperature exceeds an upper threshold;
   measuring a subsequent temperature of the component after reducing the link speed; and
   selectively causing the physical interface to increase the link speed in response to determining that the measured subsequent temperature does not exceed a lower threshold.

2. The method of claim 1, wherein the component in the adapter whose temperature is measured comprises the physical interface of the adapter to the network.

3. The method of claim 1, wherein the component in the adapter whose temperature is measured comprises the controller of the adapter that processes packets received and transmitted via a physical interface of the adapter to the network.

4. The method of claim 3, wherein the upper threshold comprises a first upper threshold, and further comprising:
   measuring a temperature of the physical interface, wherein the link speed is reduced in response to determining that the measured temperature of the physical interface exceeds a second upper threshold.

5. The method of claim 4, wherein the lower threshold comprises a first lower threshold wherein measuring the subsequent temperature of the component comprises measuring subsequent temperatures of the controller and the physical interface-after reducing the link speed and wherein the link speed is selectively increased in response to determining that the measured subsequent temperatures of the controller and physical interface fall below a first lower threshold and second lower threshold, respectively.

6. The method of claim 4, wherein the first and second upper thresholds are different.

7. The method of claim 1, wherein selectively reducing the link speed comprises the controller in the adapter causing the reduction in the link speed.

8. The method of claim 1, wherein selectively reducing the the link speed comprises an adapter driver executing in a computer system to which the adapter is coupled causing the reducing of the link speed.

9. An adaptor in communication with a network, comprising:
   a controller that performs packet processing in the adaptor;
   a physical interface that transmits and receives packets on the network;
   a sensor for measuring a temperature of a component comprising at least one of the controller and the physical interface;
   code for selectively causing the physical interface to reduce a link speed at which the physical interface negotiates to transmit packets over the network in response to determining that the measured temperature exceeds an upper threshold;
   code for measuring a subsequent temperature of the component after reducing the link speed; and
   code for selectively causing the physical interface to increase the link speed in response to determining that the measured subsequent temperature does not exceed a lower threshold.

10. The adapter of claim 9, wherein the component in the adapter whose temperature is measured comprises the physical interface of the adapter to the network.

11. The adapter of claim 9, wherein the component in the adapter whose temperature is measured comprises the controller that processes packets received and transmitted via the physical interface.

12. The adapter of claim 11, wherein the upper threshold comprises a first upper threshold, wherein the sensor is further enabled to perform:
   measuring a temperature of the physical interface, wherein the link speed is selectively reduced in response to determining that the measured temperature of the physical interface exceeds a second upper threshold.

13. The adapter of claim 12, wherein the lower threshold comprises a first lower threshold, wherein measuring the subsequent temperature of the component comprises the sensor measuring subsequent temperatures of the controller and physical interface after the link speed is selectively reduced, and wherein the link speed is increased in response to determining that the measured subsequent temperatures of the controller and physical interface fall below the first lower threshold and a second lower threshold, respectively.

14. The adapter of claim 12, wherein the first and second upper thresholds are different.

15. The adapter of claim 9, further comprising:
   a controller that processes packets received and transmitted at the adaptor, wherein selectively reducing the the link speed comprises the controller selectively causing the reduction in the link speed.

16. A system in communication with a network, comprising:
- an operating system;
- an adapter enabling communication with the network, comprising:
  - (i) a physical interface of the adapter to the network;
  - (ii) a controller that processes packets received and transmitted via the physical interface;
  - (iii) a sensor for measuring a temperature of a component and for measuring a subsequent temperature of the component after reducing the link speed at which the physical interface negotiates to transmit packets over the network, wherein the measured component comprises at least one of the controller and the physical interface;
  - (iv) code for selectively causing the physical interface to reduce the link speed in response to determining that the measured temperature exceeds an upper threshold; and
  - (v) code for selectively causing the physical interface to increase the link speed in response to determining that the measured subsequent temperature does not exceed a lower threshold; and
- an adapter driver providing an interface between the operating system and the adapter.

17. The system of claim 16, wherein the component in the adapter whose temperature is measured comprises the physical interface of the adapter to the network.

18. The system of claim 16, wherein the component whose temperature is measured comprises the controller.

19. The system of claim 18, wherein the upper threshold comprises a first upper threshold, wherein the sensor is further enabled to perform:
measuring a temperature of the physical interface, wherein the link speed is selectively reduced in response to determining that the measured temperature of the physical interface exceeds a second upper threshold.

20. The system of claim 19, wherein the lower threshold comprises a first lower threshold, wherein measuring the subsequent temperature of the component comprises the sensor measuring subsequent temperatures of the controller and the physical interface after the link speed is selectively reduced, and wherein the link speed is selectively increased in response to determining that the measured subsequent temperatures of the controller and physical interface fall below a first lower threshold and second lower threshold, respectively.

21. The system of claim 19, wherein the first and second upper thresholds are different.

22. The system of claim 16, wherein selectively reducing the link speed comprises the controller causing a reduction in the link speed.

23. A system in communication with a network, comprising:
- a motherboard;
- an operating system;
- an adapter chipset coupled to the motherboard enabling communication with the network, comprising:
  - (i) a physical interface of the adapter to the network;
  - (ii) a controller that processes packets received and transmitted via the physical interface;
  - (iii) a sensor for measuring a temperature of a component and for measuring a subsequent temperature of the component after reducing a link speed at which the physical interface negotiates to transmit packets over the network, wherein the measured component comprises at least one of the controller and the physical interface; and
  - (iv) code for selecting selectively causing the physical interface to reduce the link speed in response to determining that the measured temperature exceeds an upper threshold; and
  - (v) code for selectively causing the physical interface to increase the link speed in response to determining that the measured subsequent temperature does not exceed a lower threshold; and
- an adapter driver providing an interface between the operating system and the adapter chipset.

24. The system of claim 23, further comprising:
an Input/Output (I/O) bus interface enabling communication between the operating system and the adaptor, wherein the I/O bus interface implementing a Peripheral Component Interconnect (PCI) protocol.

* * * * *

UNITED STATES PATENT AND TRADEMARK OFFICE
CERTIFICATE OF CORRECTION

PATENT NO. : 7,177,778 B2
APPLICATION NO. : 11/001434
DATED : February 13, 2007
INVENTOR(S) : Daniel R. Gaur, Patrick L. Connor and Scott P. Dubal It is certified that error appears in the above-identified patent and that said Letters Patent is hereby corrected as shown below:

Column 8, Line 27, Claim 23, delete "and".

Column 8, Line 28, Claim 23, delete "selecting".

Signed and Sealed this

Twenty-ninth Day of September, 2009

David J. Kappos
*Director of the United States Patent and Trademark Office*